United States Patent [19]

Reddy

[11] Patent Number: 4,806,368
[45] Date of Patent: Feb. 21, 1989

[54] **SHELF LIFE AND SUBSEQUENT GROWTH OF *LACTOBACILLUS ACIDOPHILUS, PROPIONIBACTERIUM SHERMANII* AND *LEUCONOSTOC CITROVORUM* IN DIETARY FIBER BASED SUPPLEMENT PREPARATION**

[76] Inventor: Malireddy S. Reddy, 6983 S. Telluride St., Aurora, Colo. 80016

[21] Appl. No.: 97,061

[22] Filed: Sep. 16, 1987

[51] Int. Cl.⁴ .............................................. A23C 9/12
[52] U.S. Cl. ........................................ 426/61; 426/71; 426/72; 426/73; 426/74; 424/464; 424/465; 424/441
[58] Field of Search ...................... 424/464, 465, 441; 426/72-74, 61, 71

[56] References Cited

U.S. PATENT DOCUMENTS

| | | | |
|---|---|---|---|
| 4,251,550 | 2/1981 | Proctor | 426/72 |
| 4,336,247 | 6/1982 | Eriksen | 424/95 |
| 4,478,857 | 10/1984 | Stauss | 426/72 |

FOREIGN PATENT DOCUMENTS

| | | | |
|---|---|---|---|
| 231466 | 10/1959 | Austria | 426/74 |
| 2569536 | 3/1986 | France | 426/73 |
| 1181612 | 9/1985 | U.S.S.R. | 426/73 |

OTHER PUBLICATIONS

Chemical Abstracts 106(7):49005b.
Chemical Abstracts 97(7):54468e.
Chemical Abstracts 101(21):190008h.
Chemical Abstracts 104(9):68050n.
Chemical Abstracts 105(13):113974a.
Chemical Abstracts 105(19):170593z.
Brennan, et al. "Prevalence of Viable Lactobacillus Acidophilus in Dried Commercial Products", J. Food Prot. 46, 887–892 (1983).
Brennan, M.; Cellular Damage in Dried Lactobacillus Acidophilus; Journal of Food Protection 49: 47–53.

*Primary Examiner*—Jacqueline V. Howard
*Assistant Examiner*—Andrew Griffis
*Attorney, Agent, or Firm*—Kyle W. Rost

[57] ABSTRACT

Dietary fiber based tablets with *Lactobacillus acidophilus* and/or *Bifidobacterium bifidus, Leuconostoc citrovorum* and *Propionibacterium shermanii*, are prepared. To enhance the viability of *L. acidophilus* in the tablets, a combination of amino acid L-cystine, vitamin-C and vitamin-E are included. To protect and enhance the beneficial bacterial population in the human stomach and intestinal tract, calcium and magnesium salts have been incorporated along with the dietary fiber in the formula. Lecithin has been used as a lubricant. The minor amount of lactose sugar has been incorporated into the formula using preparations of acid whey, whey protein concentrate, and pure lactose. The proposed formula when tableted gave maximum protection to the *L. acidophilus* population, in comparison to the free flowing powder form. Vitamin A and D are included in the formula as nutritional supplements. Autolyzed yeast extract and enzyme digested casein have been incorporated as stimulants to the beneficial bacteria. In addition, autolyzed yeast extract serves as a major source of B-vitamins.

19 Claims, No Drawings

SHELF LIFE AND SUBSEQUENT GROWTH OF LACTOBACILLUS ACIDOPHILUS, PROPIONIBACTERIUM SHERMANII AND LEUCONOSTOC CITROVORUM IN DIETARY FIBER BASED SUPPLEMENT PREPARATION

BACKGROUND OF THE INVENTION

1. Field of the Invention

The invention relates to the development of a nutritional supplement (in the form of a tablet) using a lyophilized preparation of *Lactobacillus acidophilus, Propionibacterium shermanii,* and *Leuconostoc citrovorum* along with a major proportion of dietary apple fiber, lecithin, L-cystine, and mineral supplements of the origin calcium and magnesium. The invention permits the longevity of the health promoting bacteria in the tablets. Also, the survival and growth of these bacteria in a simulated human gastrointestinal system is greatly enhanced using the proposed invention.

2. Description of the Prior Art

*Lactobacillus acidophilus* is claimed to have therapeutic value in human beings. The organism is ingested in the form of acidophilus milk or sweet acidophilus milk or as a tablet form along with lactose sugar. In health food stores, *Lactobacillus acidophilus* has been sold in the form of tablets with the following composition: *L. acidophilus,* lactose, carboxymethyl cellulose, etc. As a matter of fact, this is the most convenient form to ingest these organisms. Some companies also sell *L. acidophilus* in the form of powder. The powder is supposed to be added to milk and then consumed. In one instance *L. acidophilus* has also been mixed with dietary fiber and sold not as tablets but in a powder form. The major problem with the available technology is that *L. acidophilus* is not viable for a great length of time. The 1983 University of Wyoming survey conducted by Brennan et. al. proved that the viability claims of manufacturers do not hold true with these products. Also, a majority of the injured or non injured (but low concentration) *L. acidophilus* bacterial cells get rapidly inactivated in the human stomach, where the pH is close to 2.0 to 2.9.

In recent years, yeast related problems are increasing dramatically. This is especially found in the intestinal tract and female reproductive organs. It is a long known fact that propionic acid inhibits yeast and molds. Propionic acid is produced by harmless *Propionibacterium shermanii* or by several species of *Propionibacterium* by using either glucose, lactose, or lactic acid as a substrate. The *Propionibacterium* can thus reduce lactate or lactic acid to propionic acid and carbon dioxide, which can retard the growth of yeasts and molds. In addition, propionic acid bacterium can synthesize B-vitamins in the human gastrointestinal tract.

It has also been stated in the literature that due to the growth of certain yeasts in the human gastrointestinal tract, a compound called acetaldehyde can accumulate and later get into the blood circulation. Scientists claim that this compound, acetaldehyde, has a pronounced depressing effect in human beings. *Leuconostoc citrovorum,* a beneficial organism that is used in the manufacture of buttermilk, has an enzyme called alcohol dehydrogenase which can destroy the acetaldehyde.

It has been clearly stated in the literature that *Lactobacillus acidophilus* has the following health benefits: 1. reduction of colon cancer, 2. reduction of cholesterol uptake into the blood stream, 3. reduction of lactose intolerace, 4. reduction of intestinal flatulence due to the growth of putrefactive bacteria.

It has been claimed in the literature that diet fiber or food fiber when consumed in recommended quantities will reduce: 1. constipation, 2. intestinal diverticulosis, 3. excess cholesterol and, 4. spastic colon. There have also been claims in the literature regarding the cancer retardation properties of vitamins E and C.

SUMMARY OF THE INVENTION

The primary object of the invention is to enhance the viability of *Lactobacillus acidophilus* in tablets and also in the gastrointestinal tract.

It is another object to include and extend the viability of *Propionibacterium shermanii* and *Leuconostoc citrovorum* along with *L. acidophilus* by the proposed tablet composition.

Another object is to protect and enhance the growth of *L. acidophilus* in the gastrointestinal tract by adding apple dietary fiber to the tablets. Furthermore, the dietary fiber may have healthful benefits such as tending to reduce colon cancer and decreasing the serum cholesterol level.

It is another object to replenish some of the minerals and vitamins that are lost due to the ingestion of fiber, as fiber speeds up the evacuation of bowel contents.

As far as is known, none of the tablets currently available in the market have *Propionibacterium shermanii* or species of Propionibacterium, *Leuconostoc citrovorum* along with *Lactobacillus acidophilus.* Also, the reducing compounds such as L-cystine have not been included in *acidophilus* tablets to enhance viability over a long period of time.

According to the invention, lyophilized bacterial cultures (*L. acidophilus, P. shermanii,* and *L. citrovorum*), reducing compounds, vitamins, minerals, lecithin, milk derived nutrients, autolyzed yeast extract and apple fiber are mixed together to make the tablets. The reducing compounds such as L-cystine are used to enhance the viability of the lyophilized bacterial preparations in the tablets. The vitamins such as vitamin E, vitamin C are employed as nutritional supplements. The minerals such as calcium carbonate and magnesium oxide are used as mineral supplements. The lecithin is employed as a natural lubricant to aid the tablet preparation. The milk derived ingredients such as acid whey powder, whey protein concentrate, and enzyme digested casein are used as bacterial growth enhancers. Also, the acid whey supplies bio-available minerals, simple and complex carbohydrate substrates, and lactates to the bacterial growth in the intestinal tract. Further, autolyzed yeast extract has been included in the tablets not only to stimulate bacterial growth in the gastrointestinal tract, but also as a B vitamin supplement. In addition, the autolyzed yeast extract also will supply most of the major and minor trace minerals. These stimulants, minerals, lactose, and vitamin D have been included in the current tablets to obviate some of the negative aspects of the dietary fiber. It has been reported that vitamin D and lactose have a major role in the absorption of calcium in the human gastrointestinal tract. The autolyzed yeast extract is an intracellular yeast substance obtained by breaking the yeast cells. In essence, the live yeast cells do not exist in the autolyzed yeast extract preparation. Even though lactose sugar helps the growth of *L. acidophilus* in the intestinal tract, several people are allergic to lactose sugar due to lactose intolerance.

However, in the present formulation, the lactose content is significantly decreased to eliminate this discomfort. Consequently these tablets can be consumed even by the lactose intolerant individuals and still derive the healthful benefits of *Lactobacillus acidophilus*.

DESCRIPTION OF THE PREFERRED EMBODIMENTS

Two types of the tablet formulations are developed. One is designated "regular" and the other set is "diet" type. The composition of these tablets (750 mg) are as follows:

TABLET COMPOSITION AND METHOD OF PRODUCTION

| Ingredients | Regular Type | Diet Type |
|---|---|---|
| Apple Fiber | 320 mg | 510 mg |
| L-cystine | 3 mg | 1 mg |
| Lecithin (powdered) | 20 mg | 20 mg |
| Acidophilus powder | 100 mg | 25 mg |
| Propionic Acid Bacterium Powder | 2.5 mg | 0.5 mg |
| *Leuconostoc citrovorum* Powder | 2.5 mg | 0.5 mg |
| Autolyzed Yeast Extract | 40 mg | 15 mg |
| Acid Whey Powder | 50 mg | 30 mg |
| Whey Protein Concentrate | 10 mg | 2.5 mg |
| Vitamin - A | 1500 I.U. | 425 I.U. |
| Vitamin - D3 | 150 I.U. | 42.5 I.U. |
| Vitamin - E | 10 I.U. | 2 I.U. |
| Vitamin - C | 20 mg | 10 mg |
| Calcium Carbonate | 90 mg | 75 mg |
| Magnesium Carbonate | 5 mg | 5 mg |
| Magnesium Oxide | 5 mg | 5 mg |
| Calcium Phosphate | 20 mg | 10 mg |
| Lactose | 45.5 mg | 32 mg |
| Enzyme Digested Casein | 4 mg | 5 mg |

These ingredients were combined according to the following method. The acidophilus powder, propionic acid bacterium powder, Leuconostoc powder, acid whey, whey protein concentrate, autolyzed yeast extract, enzyme digested casein and calcium phosphate should be fine and they should pass through a 35 mesh (U.S. No. 40 Screen—Tyler). If they are not fine, they should be gently ground to meet the specification. Then L-cystine, acidophilus powder, propionic acid bacterium powder, Leuconostoc powder, acid whey, whey protein concentrate, vitamin A, vitamin D3, vitamin E, vitamin C, calcium carbonate, magnesium carbonate, lactose, calcium phosphate, magnesium oxide, autolyzed yeast extract and enzyme digested casein are mixed with an equal quantity of apple or any other vegetable dietary fiber. Particular care should be given to the magnesium carbonate and calcium carbonate to adequately distribute them throughout the mix. Then the above prepared ingredient mix is combined with the reminder of the dietary fiber. The ingredients are mixed thoroughly and then the powdered lecithin is added. The total mix is passed through a 20 mesh screen, remixed and passed again through the 20 mesh screen. Then the mix is tableted using a single punch Colton 330-33 machine. The punch used was one-half inch standard concave with a fill weight adjusted to 750 mg (+5%).

The tablets were compressed to a hardness of 11 to 14 kg (Pfizer). The thickness of the tablets varies up to 5.9 mm(1 to 2%) (Ames). After forming, the tablets were stored in metal containers.

DESCRIPTION

The regular version of the tablets (750 mg) will supply the high concentrations of *L. acidophilus* and other bacteria if they are consumed at the rate of 3 per day. Three regular tablets per day will supply the U.S.R.-D.A. vitamin A, D, E,and C requirements. The diet version is designed to supply the maximum amount of dietary fiber. Since these tablets have to be consumed in large quantities, the vitamin, mineral, and bacterial concentrations have been significantly reduced. Using the same ratio of ingredients, tablets can be made of any size ranging from 250 mg to 2500 mg.

According to one novel aspect of the invention, L-cystine, vitamin E, and vitamin C, when incorporated into the tablets, produce the exceptional result of enhancing the viability of the *Lactobacillus acidophilus*. The primary intent of using these vitamins in these tablets is to supply the vitamins along with acidophilus. Later it was discovered that they protect the bacterial cells in the tablets, apparently due to their antioxidation properties. However, L-cystine has been deliberately added to reduce the oxygen in the tablets so that the bacterial cell life can be extended. Experimentally, it is proven in this invention that a combination of L-cystine, vitamin C, and vitamin E had a pronounced effect on maintaining the viability of the bacterial cells in the presence of dietary fiber and other ingredients. It should be noted that dietary fiber of the type employed contains insoluble fiber elements.

It has been stated in the literature that dietary fiber has an exceptional ability of imbibing water and thus moves food faster in the human gastrointestinal tract. Consequently, it can decrease the mineral uptake by the intestinal mucosa. To offset this, I have included calcium and magnesium carbonates, oxides, and phosphates. Later, it was discovered that these mineral salts are extremely essential for the survival of the *Lactobacillus acidophilus* in the low pH stomach contents.

Also, the diet fiber is included in the tablets as a dietary supplement. A further aspect of the invention is the discovery that after reconstitution, the diet fiber (apple) has an exceptionally protective and stimulatory effect on the growth of *Lactobacillus acidophilus*, in the presence of neutralizing calcium and magnesium salts.

Thus this invention is novel not only to protect the viability of the therapeutic bacteria in the tablets but also to protect them under the acidic conditions of the human stomach. In addition, the formulation has a positive effect of stimulating the growth of *L. acidophilus* in the presence of bile salts, which condition exists in the human small intestine.

The harmless Swiss cheese associated propionic acid bacterium is included along with the *L. acidophilus* for the following reasons:

1. Propionic acid bacterium can create slightly anaerobic conditions which is conducive for the growth of *L. acidophilus*.

2. The excess lactic acid produced by *L. acidophilus* in the gut can be converted by propionic acid bacterium to propionic acid and carbon dioxide. The propionic acid has a pronounced effect on retarding mold and yeast growth.

3. The propionic acid bacteria can synthesize B vitamins, which can further stimulate *L. acidophilus*.

4. The propionic acid bacteria have catalase enzyme so that they can detoxify hydrogen peroxide to water and oxygen. Hydrogen peroxide is highly detrimental to the growth *Lactobacillus acidophilus.*

The *Leuconostoc citrovorum*, a micro organism which is used in the manufacture of buttermilk, is included in the tablets along with the *L. acidophilus* and propionic acid bacterium for the following reasons:

1. *Leuconostoc citrovorum* has an enzyme alcohol dehydrogenase, which can destroy acetaldehyde. It has been claimed that the growth of yeasts in the intestinal tract produces acetaldehyde, which is responsible for depression symptoms in human beings.

2. This organism can utilize simple sugars and citrate and thus can produce a slight amount of carbon dioxide, which is beneficial for the growth of *L. acidophilus* and propionic acid bacterium.

Even though several therapeutic benefits exist due to these bacteria, the real problem has been how to keep them active and have them grow and attach to the human intestinal tract. This invention can achieve this goal. Both the regular and diet type tablets have been tried on an experimental basis on several age group humans and there were no side effects, such as excessive gas, variations in stools etc. The single most positive comment given was the dramatic improvement of the bowel movement. Also, the diet tablets greatly improved the stamina of people who are on 1000 calorie/day diet, besides helping them to loose weight and avoid the bowel problem.

The method of present invention is further illustrated by the following examples:

EXAMPLE 1

The ingredients used in this and all other examples were obtained from the following sources:

1. Apple fiber—Tree Top, Inc., P.O. Box 248, Selah, Wash. 98942.
2. *Lactobacillus acidophilus* lyophlilized preparations—Chris Hansen Laboratories, 9015 West Maple St. Milwaukee, Wis. 53214
3. Lyophilized Propionibacterium and Leuconostoc cultures—Vivolae Cultures Corp., 3862 East Washington St., Indianapolis, Ind. 46201
4. L-cystine—Nutritional Bio-chemicals, Cleveland, Ohio
5. Calcium phosphate—Strauffer Chemical Co. Food Ingredient Div. Cheeseburough Ponds Inc., West Port, Conn. 06881-0852
6. Calcium Carbonate—Pfizer, Inc.; Minerals, Pigments, and Metals Division; New York, N.Y. 10017
7. Magnesium oxide and magnesium carbonate, and vitamin C—Merck and Co., Rahway, N.J.
8. Vitamin A, D, E—Roche Chemical Division, Hoffman Laroch Inc., Nutty, N.J. 07110
9. Acid whey powder—Deltown, Chemurgic Corp., 170 Sawmill River Rd., Yonkers, N.Y. 10701
10. Whey protein concentrate, lactose and enzyme digested casein—Mid America Dairymen Inc., Springfield, Mo. 65805-1837.
11. Autolyzed yeast extract—Busch Industrial Products Corporation, St. Louis, Mo. 63127.
12. Lecithin—American Lecithin Company, P.O. Box 4036, Atlanta, Ga. 30302.

The bacteria powders employed contain lyophilized bacteria, which remain viable. By the term, "lyophilized," it is intended to include substantially any technique or variation for preserving viable bacteria in a dry or powdered form, such that the bacteria can be incorporated into a tablet formulation.

The regular type tablets were prepared according to the composition outlined under the section entitled TABLET COMPOSITION AND METHOD OF PRODUCTION. In one set of the samples, calcium carbonate, magnesium carbonate, magnesium oxide and calcium phosphate were eliminated. In an another set of samples only fiber was eliminated. These individual tablets were dissolved in 15.0% solids reconstituted whey protein concentrate (31% protein) whose pH has been adjusted to 2.8 using hydrochloric acid. In this example, the whey protein concentrate was used to simulate food and pH was lowered to 2.8 to simulate the acidic conditions of the human stomach. In each one hundred ml of the simulated human stomach contents, 1 tablet (750 mg) was dissolved. The three tablets, representing three different compositions, were dissolved in 3 different bottles. The initial concentration of *Lactobacillus acidophilus* was determined by plating on MRS Agar with 0.15% bile salts. Then the three bottles were incubated at 37° C. (human body temperature) for 4h. This 4h Incubation time was elected to simulate the retention time of food in human stomach. At the end of the incubation, the *L. acidophilus* counts again were determined. Then to each bottle, 0.15% of bile salts were added and the pH of the contents were adjusted to 7.1+0.1. This part will simulate the human intestinal tract. Then the bottles were incubated for 4 more hours at 37° C. At the end of this second incubation, the total *L. acidophilus* counts again were determined. The results are summarized in Table I. These results indicate that, when calcium and/or magnesium salts are not included in the tablets, the viability of *L. acidophilus* was reduced significantly and the organisms didO not recover even when the pH was raised to 7.0. On the contrary, when the diet fiber was eliminated from the tablets, there was only a slight reduction in the numbers of *L. acidophilus* in the stomach. However, there was no apparent increase of the growth of *L. acidophilus* upon further incubation at pH 7.0. The third tablet, in which all the ingredients were included (calcium and/or magnesium salts plus the diet fiber), there was from an insignificant reduction to no reduction in the viability of the *L. acidophilus* during the first four hour incubation (simulated stomach conditions). In addition, there was a significant increase of the growth of *L. acidophilus* observed after pH was raised to 7.0 and then incubated for 4 more hours. This clearly proves that the calcium and magnesium salts have a pronounced effect of protecting the *L. acidophilus* bacteria under the acidic conditions that exist in the stomach. This is partly due to their neutralizing effect on the stomach acids. Diet fiber alone could not protect the *L. acidophilus* from acid damage. Both the fiber and calcium and/or magnesium salts have a synergistic effect of not only protecting the *L. acidophilus* bacteria from acid injury, which is incurred under the stomach conditions, but also stimulating these bacteria to grow under the conditions prevalent in the small and large intestinal tract. This is a very novel aspect of this invention. Similar results were obtained with the diet formula of the current invention with both *L. acidophilus* and/or *Bifidobacterium bifidus.*

TABLE I

| No. | Variables in the tablet formulation | Lactobacillus acidophilus Counts/gram at: | | |
|---|---|---|---|---|
| | | 0 Time | After 4 h Incubation at 37 C. at pH 2.8 | After 4 h Additional Incubation at 37 C. at pH 7.0 in the presence of 0.15% Bile Salts |
| 1 | Fiber but no Calcium and Mg Salts added | $80 \times 10^5$ | $100 \times 10^1$ | $60 \times 10^1$ |
| 2 | No Fiber but Ca and Mg Salts added | $80 \times 10^5$ | $40 \times 10^5$ | $60 \times 10^5$ |
| 3 | Fiber plus Ca and Mg Salts added | $80 \times 10^5$ | $60 \times 10^5$ | $200 \times 10^6$ |

EXAMPLE 2

The effect of stimulants upon the survival and proliferation of *Lactobacillus acidophilus* has been determined. The tablets were prepared using the regular formula, except for the following variations:

1. The first batch was prepared with all the ingredients, including three stimulants: autolyzed yeast extract, acid whey, and enzyme hydrolyzed casein—each 32 mg/750 mg tablet.
2. The second batch was prepared using only the yeast extract as stimulant—96 mg/750 mg tablet.
3. The third batch was prepared using only the acid whey as stimulant—96 mg/750 mg tablet.
4. The fourth batch was prepared using only the enzyme digested casein—96 mg/750 mg tablet.
5. The fifth batch was prepared with no stimulants. In this case, the amount of stimulant was replaced by the apple fiber to arrive at the equal weight.

The experimental procedure was same as that outlined in Example 1.

The results of this example are presented in Table 2. From these it appears that all three stimulants have a pronounced effect on the growth of *L. acidophilus* in the presence of bile salts. In order of preference, the autolyzed yeast extract ranked number one, followed by enzyme digested casein and acid whey. However, when all three stimulants were used, there was a significant increase of *L. acidophilus* over the use of an individual stimulant. This could be due to some interactive effect.

TABLE II

| No. | Variable in the tablet formulation | Lactobacillus acidophilus Counts/gram at: | | |
|---|---|---|---|---|
| | | 0 Time | After 4 h Incubation at 37 C. at pH 2.8 | After 4 h Incubation at pH 7.0 in the presence of 0.15% Bile Salts |
| 1 | All three stimulants included | $68 \times 10^5$ | $53 \times 10^5$ | $280 \times 10^6$ |
| 2 | Only autolyzed yeast extract included | $68 \times 10^5$ | $50 \times 10^5$ | $180 \times 10^6$ |
| 3 | Only acid whey included | $68 \times 10^5$ | $42 \times 10^5$ | $82 \times 10^6$ |
| 4 | Only enzyme digested casein included | $68 \times 10^5$ | $57 \times 10^5$ | $150 \times 10^6$ |
| 5 | None of the stimulants included | $68 \times 10^5$ | $45 \times 10^5$ | $100 \times 10^5$ |

EXAMPLE 3

To determine the effect of reducing amino acid L-cystine on the survival of *Lactobacillus acidophilus*, the following example is illustrated. The regular type tablets were prepared using the formula outlined above in TABLET COMPOSITION AND METHOD OF PRODUCTION. As a variation, in one batch, the amino acid L-cystine was eliminated. Since the antioxidants vitamin-C and vitamin-E are in the formulation, their effect on the viability of *L. acidophilus* also was evaluated. To accomplish this, in one formulation, both the vitamin-C and vitamin-E were eliminated. As a negative control, in one batch of tablets, L-cystine and the vitamins C and E were completely eliminated. In all these four batches of tablets, the initial concentration of *L. acidophilus* was determined at the time of tableting. Then the tablets were stored for 3 months at refrigeration temperature. At the end of the storage period, the *L. acidophilus* counts were once again determined. The results are presented in Table 3. From these data, it is obvious that the elimination of L-cystine and vitamins C and E from the formulation, resulted in a significant decrease in the viability of *L. acidophilus* during storage. The inclusion of vitamin C and E alone without L-cystine, restored partially the viability of *L. acidophilus*. However, L-cystine alone, without the vitamins C and E, was far superior in retaining the viability of *L. acidophilus* in the current formulation. It is very interesting to observe that the combination of L-cystine, vitamin-C and vitamin-E has significantly increased the viability of *L. acidophilus* in the current formulation.

The vitamins were included as nutritional supplements. Surprisingly it turned out that the combination of L-cystine and vitamins C and E greatly improved the viability of *L. acidophilus* over the amino acid L-cystine alone. This is an other significant feature of this invention.

TABLE III

| No. | Variable | Lactobacillus acidophilus Count/tablet at: | |
|---|---|---|---|
| | | 0 Time | After three months storage |
| 1 | No L-cystine but ascorbic acid and vitamin E are added | 200 × 10$^6$ | 20 × 10$^6$ |
| 2 | L-cystine but no ascorbic acid and vitamin E are added | 200 × 10$^6$ | 80 × 10$^6$ |
| 3 | L-cystine plus ascorbic acid and vitamin E are added | 200 × 10$^6$ | 130 × 10$^6$ |
| 4 | No L-cystine, no ascorbic acid and no vitamin E are added | 200 × 10$^6$ | 60 × 10$^5$ |

EXAMPLE 4

Using the formula described in TABLET COMPOSITION AND METHOD OF PRODUCTION, an experiment was designed to check the effect of tableting on the viability of *Lactobacillus acidophilus* upon storage. After all the powders have been mixed, one half of the sample was further processed to make tablets. The other half was allowed to stay in the powder form. The initial population of *L. acidophilus* was determined in both the preparations. Then the samples were stored for 3 months, part at 4° C. and part at room temperature (21° C.). At the end of the storage period, the samples—both the powder and tablet form of the formulation—were plated to determine the total count of *L. acidophilus* bacteria. The results of this example are presented in Table 4. It is apparent from the data that the proposed formula prolonged the viability of *L. acidophilus* when tableted rather then in powder form. This result is logically explained by the exclusion of the air from the formulation by tableting, since air is toxic to *L. acidophilus* during storage. Even though the antioxidants are included in the formula, it is necessary to exclude the entry of air by tableting for the improved viability of *L. acidophilus* and other beneficial bacteria. Also, the present formulation can extend the shelf life of *L. acidophilus* even when the tablets are stored at room temperature.

TABLE IV

| No. | Variable | Lactobacillus acidophilus Count/tablet at: | |
|---|---|---|---|
| | | 0 Time | After three months storage |
| 1 | All the ingredients are pulverized and left as loose powder | 160 × 10$^6$ | 40 × 10$^6$ |
| 2 | All the ingredients are pulverized and compressed as tablets | 160 × 10$^6$ | 110 × 10$^6$ |

EXAMPLE 5

The effectiveness of the current formulation in maintaining the viability of *Propionibacterium shermanii* and *Leuconostoc citrovorum* was investigated. The tablet formulation and the amounts of lyophilized cultures used were same as outlined under the section entitled TABLET COMPOSITION AND METHOD OF PRODUCTION. All three bacterial preparations were included. After the tablets were made (regular type), the initial concentrations of *Propionibacterium shermanii* and *Leuconostoc citrovorum* were determined using special selective agars. Then the tablets were tightly sealed and stored for a period of 3 months at 4° C. At the end of the storage period, once again the *Propionibacterium shermanii* and *Leuconostoc citrovorum* counts were determined. The results of this study are presented in Table 5. The data clearly indicate that the present formulation has a tremendous protective effect upon the *Propionibacterium* and *Leuconostoc* in addition to the *Lactobacillus acidophilus*.

TABLE V

| No. | Bacterial strain Designation | Bacterial counts/tablet obtained at: | |
|---|---|---|---|
| | | "0" Time | After 3 months storage |
| 1 | *Propionibacterium shermanii* | 200 × 10$^4$ | 110 × 10$^4$ |
| 2 | *Leuconostoc citrovorum* | 160 × 10$^4$ | 92 × 10$^4$ |

EXAMPLE 6

The efficiency of the present formulation upon maintaining the viability of the following beneficial bacterial species was investigated: *Streptococcus thermophilus, Lactobacillus bulgaricus, Lactobacillus casei, Lactobacillus caucasicus, Lactobacillus lactis, Lactobacillus helveticus, Streptococcus lactis, Streptococcus cremoris, Streptococcus diactilactis, Streptococcus durans,* and *Streptococcus faecalis*. The tablet formulation was same as in example 5, except lyophilized preparations of the above specified organisms along with *L. acidophilus, B. bifidus, P. shermanii,* and *L. citrovorum* were included at the rate of 7 mg of each organism per 750 mg tablet. Since all the fifteen organisms were included, the total amount of bacterial preparations came to 105 mg/750 mg tablet. The total bacterial counts and the Enterococcus counts were determined at "0" time and after 3 months storage at 4° C. Even though accurate counts of each organism were not determined because of the complexity, on the basis of the total counts and Enterococcus counts, it appears that these organisms are protected in the tablets with the present formulation. The results of this study are presented in Table 6.

TABLE VI

| Bacterial counts/tablet obtained at: | | | | | |
|---|---|---|---|---|---|
| 32 C. Using tryptic soy agar | | 37 C. Using tryptic soy agar | | 37 C. using KF agar | |
| "0" Time | After 3 Mo. | "0" Time | After 3 Mo. | "0" Time | After 3 Mo. |
| $68 \times 10^6$ | $21 \times 10^6$ | $43 \times 10^6$ | $120 \times 10^5$ | $120 \times 10^5$ | $100 \times 10^5$ |

The foregoing is considered as illustrative only of the principles of the invention. Further, since numerous modifications and changes will readily occur to those skilled in the art, it is not desired to limit the invention to the exact formulation and method shown and described, and accordingly all suitable modifications and equivalents may be regarded as falling within the scope of the invention as defined by the claims that follow.

I claim:

1. A dietary fiber based vitamin, mineral, and beneficial bacteria tablet with enhanced bacterial viability, comprising:
   apple fiber including insoluble fiber elements;
   lyophilized live bacteria;
   a vitamin having antioxidant properties;
   an amino acid having reducing properties;
   an alkaline mineral salt; and
   means for stimulating bacterial growth.

2. The tablet of claim 1, wherein said lyophilized live bacteria is selected from the group consisting of *Lactobacillus acidophilus, Bifidobacterium bifidus, Priopionibacterium shermanii, Leuconostoc citrovorum, Streptococcus thermophilus, Lactobacillus bulgaricus, Streptococcus lactis, Streptococcus cermoris, Streptococcus durans, Streptococcus faecalis, Lactobacillus casei, Lactobacillus caucasicus, Lactobacillus lactis,* and *Lactobacillus helveticus.*

3. The tablet of claim 1, wherein said vitamin is selected from the group consisting of vitamin C and vitamin E.

4. The tablet of claim 3, wherein said amino acid comprises a sulfur containing acid.

5. The tablet of claim 4, wherein said amino acid comprises L-cystine.

6. The tablet of claim 1, wherein said mineral salt is selected from the group consisting of the carbonates, oxides, and phosphates of calcium and magnesium suited for human ingestion.

7. The tablet of claim 6, wherein said mineral salt comprises calcium carbonate, calcium phosphate, magnesium carbonate and magnesium oxide.

8. The tablet of claim 1, wherein said means for stimulating bacterial growth is selected from the group consisting of autolyzed yeast extract, acid whey, and enzyme hydrolyzed casein.

9. The tablet of claim 1, wherein said dietary fiber is present at a level corresponding to from about 320 mg to 510 mg per 750 mg total.

10. The tablet of claim 1, wherein said amino acid is present at a level corresponding to from about 1 mg to 3 mg per 750 mg total.

11. The tablet of claim 1, wherein said live bacteria are present at a level corresponding to from about 25 mg to 105 mg per 750 mg total.

12. The tablet of claim 1, wherein said mineral salts are present at a level corresponding to from about 5 mg to 120 mg per 750 mg total.

13. The tablet of claim 1, wherein said vitamin comprises vitamin C present at a level corresponding to from about 10 mg to 20 mg per 750 mg total.

14. The tablet of claim 1, wherein said vitamin comprises vitamin E present at a level corresponding to from about 2 I.U. to 10 I.U. per 750 mg total.

15. The tablet of claim 1, wherein said means for stimulating bacterial growth comprises autolyzed yeast extract present at a level from about 15 mg to 40 mg per 750 mg total.

16. The tablet of claim 1, wherein said means for stimulating bacterial growth comprises acid whey powder present at a level from about 30 mg to 50 mg per 750 mg total.

17. The tablet of claim 1, wherein said means for stimulating bacterial growth comprises enzyme hydrolyzed casein present at a level from about 4 mg to 5 mg per 750 mg total.

18. The tablet of claim 1, further comprising lecithin.

19. A dietary fiber based vitamin, mineral, and beneficial bacteria tablet with enhanced bacterial viability, comprising: apple fiber, L-cystine, lecithin, acidophilus powder, propionic acid bacterium powder, *Leuconostoc citrovorum* powder, autolyzed yeast extract, acid whey powder, whey protein concentrate, vitamin C, vitamin E, a food grade alkaline salt of calcium, a food grade alkaline salt of magnesium, lactose, and enzyme digested casein.

* * * * *